United States Patent Office 3,471,198
Patented Oct. 7, 1969

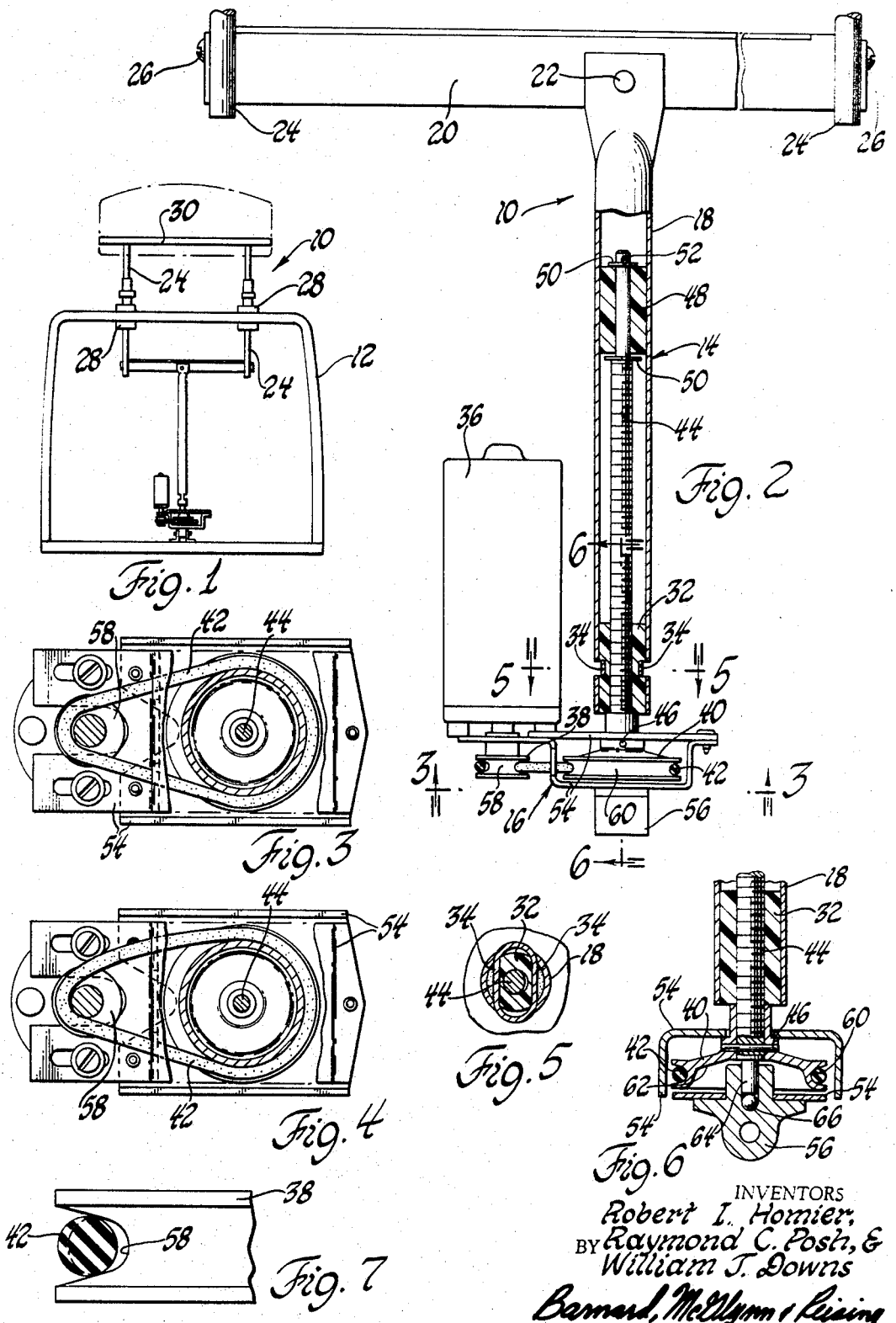

3,471,198
HEADREST ASSEMBLY
Robert I. Homier, Farmington, Raymond C. Posh, Livonia, and William T. Downs, Detroit, Mich., assignors to Lear Siegler, Inc., Santa Monica, Calif., a corporation of Delaware
Filed Oct. 16, 1967, Ser. No. 675,588
Int. Cl. A47c 7/38
U.S. Cl. 297—410                                   12 Claims

ABSTRACT OF THE DISCLOSURE

A headrest assembly including a housing for supporting a headrest and disposed about a threaded shaft with a nut threadedly engaging the shaft and secured to the housing so that upon rotation of the shaft the housing moves relative thereto. A power source is included and drives a first pulley which in turn drives a second pulley by way of a belt. The drive pulley has a groove disposed thereabout in which the belt is disposed and the groove has converging sides joined by a concave arcuate portion. The belt is of a circular cross section and normally engages the converging sides of the groove in spaced relation to the concave arcuate portion but may move into the groove to engage the concave arcuate portion and slide or slip relative to the concave arcuate section in response to a predetermined torque resisting rotation of the pulley, which in turn increases tension on tensioned reach of the belt.

Power actuated headrest assemblies for use in vehicles such as automobiles are known in the prior art. Normally the prior art headrest assemblies use an electric motor for a power source. The electric motor drives an appropriate mechanism for positioning the headrest. It frequently occurs that, when the electric motor is actuated and the headrest is moved to an extreme position where it is prevented from moving further, the electric motor can be damaged by continuing the supply of current thereto. That is, the electric motor is prevented from rotating, yet current is supplied to the motor. This can be eliminated by utilizing a clutch in combination with such an electric motor in the headrest assembly. The utilization of a clutch, however, makes the system more complex, expensive, and difficult to maintain.

Accordingly, it is an object and feature of this invention to provide an improved headrest assembly having an automatic or built-in clutching feature.

Another object and feature of this invention is to provide an improved headrest assembly including first and second pulleys interconnected by an endless belt which coacts with at least one of the pulleys to slip or slide relative thereto in response to a predetermined torque resisting rotation of the driven pulley.

FIGURE 1 is an elevational view of a preferred embodiment of the instant invention in combination with a seat back frame;

FIGURE 2 is an enlarged fragmentary view of the preferred embodiment;

FIGURE 3 is a cross-sectional view taken substantially along line 3—3 of FIGURE 2;

FIGURE 4 is a cross-sectional view similar to FIGURE 3 but showing the belt in the position where a predetermined torque is resisting rotation of the driven pulley;

FIGURE 5 is a cross-sectional view taken substantially along line 5—5 of FIGURE 2;

FIGURE 6 is a cross-sectional view taken substantially along line 6—6 of FIGURE 2; and FIGURE 7 is an enlarged fragmentary view showing the normal running relationship between the belt and the pulley in full lines.

Referring now to the drawings wherein like numerals indicate like of corresponding parts throughout the several views, a headrest assembly constructed in accordance with the instant invention is generally shown at 10. The headrest assembly 10 is shown in FIGURE 1 in combination with the back frame 12 of a seat assembly.

The headrest assembly 10, as best illustrated in FIGURE 2, includes a headrest support means generally indicated at 14 and actuation means generally indicated at 16. The actuation means 16 is operatively connected to the headrest support means 14 for selectively adjusting the position of the headrest support means relative thereto.

The headrest support means 14 includes a tubular housing 18 which is secured to a cross bar 20 by a rivet 22 or the like. A pair of spaced rods 24 are attached to the cross bar 20 by the bolts 26. The rods 24 extend through bushings 28 in the seat back frame 12 and support a bar 38 which in turn supports a headrest as indicated in phantom in FIGURE 1. A nut 32 is secured to the housing 18 by inwardly bent portions 34 so that the nut is non-movable relative to the housing 18.

The actuation means 16 includes a power source comprising the electric motor 36 which drives a first pulley 38. There is also included a second driven pulley 40. The first and second pulleys 30 and 40 are interconnected by an endless belt 42 which engages the pulleys for rotating the pulley 40 in response to rotation of the first pulley 38. The pulley 40 is secured to a shaft 44 by a pin 46. The nut 32 threadedly engages the threaded shaft 44 so that upon rotation of the pulley 40, the nut 32, and the housing 18 and, consequently, headrest support means 14 moves vertically. A guide member 48 is disposed between two washers 50 of the upper end of the shaft 44. A pin 52 maintains the guide 48 and the washers 50 in position on the shaft 44. The guide 48 is disposed on the shaft and engages the housing 18 to prevent relative lateral movement between the housing 18 and the shaft 44.

There is also included a bracket means 54 which supports the electric motor 36 and a bearing means 56. The pulley 38 has a groove 58 disposed thereabout and the pulley 40 has a groove 60 disposed thereabout. As best illustrated in FIGURE 6, the pulley 40 has recess 62 and the end portion of the shaft 64 is rotatably supported by the bearing means 56 and in a plane which bisects the groove 60 of the pulley 40. A bearing ball 66 is disposed between the shaft portion 64 and the bearing means 56. There is, therefore, only one bearing which rotatably supports the pulley 40 and the shaft 44, and the bearing contact is disposed in the plane which bisects the groove 60 of the pulley 40, i.e., bisects the pulley 40. The forces applied to the pulley 40 by the belt 42 act in the plane bisecting the groove 60 and, therefore, the forces on the bearing portion 64 are not the result of moments; thus reducing rotational friction and bearing wear.

There is also included means to allow slippage of the belt 42 relative to the pulley 38 in response to a predetermined torque resisting rotation of the driven pulley 40, which in turn places tension on the tensioned reach of the belt 42. This means a belt 42 and a groove 58 in the pulley 38 which includes a cross section having converging side walls joined by a concave arcuate portion. The belt 42 has a substantially circular cross section which normally engages only the side walls of the groove, as illustrated in full lines in FIGURE 7. During the normal running of the assembly the belt 42 engages groove 58 of the pulley 38 as illustrated in FIGURES 3 and 7. When a predetermined torque resists rotation of the driven pulley 40, as when the headrest assembly reaches an extreme limit of travel, tension is applied to the tensioned reach of the belt 42. Preferably the belt is radially resilient but not longitudinally stretchable, as by including a non-stretchable core. Hence, the increased tension on the tensioned reach of the belt causes the cross-sectional configuration of the belt as it engages the groove 58 to change so that the belt 42 moves into the groove 58. During the normal running engagement with the groove 58, the belt 42 is in minimal contact with the groove 58 as illustrated in full lines in FIGURE 7. As the load is increased and the belt 42 moves into the groove 58, the area of contact between the belt 42 and the groove 58 increases. In other words, as the torque output of the drive pulley 38 increases, the frictional contact between the belt 42 and groove 58 increases. The area of contact between the belt 42 and the groove 58 will increase as the torque output of the pulley 38 increases until the contact between the belt 42 and groove 58 is at a maximum, whereat the belt 42 engages the arcuate portion of the groove 58 as illustrated in phantom in FIGURE 7. Any additional resistance to rotation of the pulley 40, i.e., increased torque demand on pulley 38, the belt 42 will slip or slide along the groove 58. Therefore, upon a predetermined torque resisting rotation of the driven pulley 40, an automatic clutching occurs to allow the pulley 38 to rotate while the belt 42 and pulley 40 remain stationary.

In an alternative embodiment, the belt 42 may be elastic so that it will elongate or stretch when placed under tension. When a predetermined torque resists rotation of the driven pulley 40 and tension is applied to the tensioned reach of the belt 42, the tensioned reach of the belt 42 elongates or stretches enough to provide a reduced cross section which contacts and slides relative to the arcuate portion of the groove 58. This too, therefore, provides an automatic clutching function.

As the tension on the tensioned reach of the belt 42 increases, the non-tensioned reach moves increasingly out of the groove 58 on the belt output side of the pulley 38 as illustrated in FIGURE 4, this, in turn, reduces the total contact between the belt 42 and the groove 58. This occurs whether the belt 42 is elastic or not, since as the belt 42 moves into the groove 58 on one side of the pulley 38, the slack created thereby moves out of the groove 58 on the other side of the pulley 38.

The invention has been described in an illustrative manner and it is to be understood that the terminology which has been used is intended to be in the nature of words of description rather than of limitation.

Obviously, many modifications and variations of the present invention are possible in light of the above teachings.

The embodiments of the invention in which an exclusive property or privilege is claimed are defined as follows:

1. A headrest assembly comprising: headrest support means, actuation means operatively connected to said headrest support means for selectively adjusting the position of the latter relative thereto and including first and second pulleys, a power source driving said first pulley, an endless belt engaging said pulleys for rotating said second pulley in response to rotation of said first pulley thereby to adjust the position of said headrest support means, and means to allow slippage of the belt relative to said pulley in response to a predetermined torque resisting rotation of said second pulley.

2. An assembly as set forth in claim 1 wherein said means comprises a groove in said first pulley, said groove having a cross section including side walls which converge and are joined by a concave arcuate portion, said belt being disposed in said groove.

3. An assembly as set forth in claim 2 wherein said belt has a cross section which normally engages only the side walls of said groove in rotating said second pulley and is radially resilient to change in cross-sectional configuration to contact and slide relative to said arcuate portion in response to said predetermined torque.

4. An assembly as set forth in claim 3 wherein said belt normally has a substantially circular cross-section.

5. An assembly as set forth in claim 2 wherein said belt has a cross-section which normally only engages the side walls of said groove in rotating said second pulley and elongates to provide a reduced cross-section which contacts and slides relative to said arcuate portion in response to said predetermined torque.

6. An assembly as set forth in claim 5 wherein said belt normally has a substantially circular cross-section.

7. An assembly as set forth in claim 4 including a shaft, said second pulley having a groove thereabout for receiving said belt and being connected to said shaft for rotating the latter, a bearing means rotatably supporting said shaft and said second pulley in the plane which bisects said groove of said second pulley.

8. An assembly as set forth in claim 7 wherein said shaft is threaded, said headrest support means includes a nut threadedly engaging said shaft so that said headrest support means moves relative to said shaft upon rotation of the latter.

9. An assembly as set forth in claim 8 including a housing disposed about said shaft and secured to said nut, a guide disposed on said shaft and engaging said housing.

10. An assembly as set forth in claim 9 including a cross-bar secured to said housing, a pair of spaced rods attached to said cross-bar for supporting a headrest.

11. An assembly as set forth in claim 10 including bracket means supporting said power source and said bearing means.

12. An assembly as set forth in claim 1 including a shaft, said second pulley having a groove thereabout for receiving said belt and being connected to said shaft for rotating the latter, a bearing means rotatably supporting said shaft and said second pulley in the plane which bisects said groove in said second pulley.

References Cited
UNITED STATES PATENTS

| | | | |
|---|---|---|---|
| 2,721,158 | 10/1955 | Mans | 74—238 X |
| 2,802,219 | 8/1957 | Travis | 5—67 |
| 2,985,229 | 5/1961 | Shamblin | 297—410 |
| 3,031,894 | 5/1962 | Chavand | 74—216.5 |
| 3,224,381 | 12/1965 | Stewart | 74—230.7 X |
| 3,311,413 | 3/1967 | Martens | 297—410 |
| 3,345,107 | 10/1967 | Homier et al. | 297—410 |

CASMIR A. NUNBERG, Primary Examiner

U.S. Cl. X.R.

74—216.5